3,197,496
POLYPHOSPHORUS ESTER DERIVATIVES OF O,O-DIHYDROCARBYL-s-HYDROXYLALKYL PHOSPHORODITHIOATES
William M. Le Suer, Cleveland, Ohio, assignor to The Lubrizol Corporation, Wickliffe, Ohio, a corporation of Ohio
No Drawing. Filed Aug. 9, 1961, Ser. No. 130,270
8 Claims. (Cl. 260—461)

This invention relates to acidic phosphorus-containing compositions and to a process of preparing the same.

Organic acidic phosphorus-containing compositions are useful in the manufacture of plasticizers, pesticides, weed-killers, rust-inhibitors, corrosion-inhibitors, detergents, fire-resistant coatings, etc. They are useful also as intermediates in the preparation of neutralized phosphorus-containing products which in turn have found applications for various purposes. An important characteristic of such neutralized products is thermal stability. In almost all instances this characteristic is closely related to the thermal stability of the acidic phosphorus-containing intermediates from which the neutralized products are derived. There is, accordingly, a great deal of interest in processes for preparing thermally stable organic acidic phosphorus-containing compositions.

It is, accordingly, a principal object of this invention to provide a process for preparing such acidic phosphorus-containing compositions.

It is also an object of this invention to provide novel phosphorus-containing compositions.

It is also an object of this invention to provide acidic phosphorus-containing compositions which, upon neutralization, yield useful products.

It is also an object of this invention to provide acidic phosphorus-containing compositions adapted especially for use as intermdiates for preparation of neutralized products effective as additives in hydrocarbon oils, particularly lubricating compositions.

These and other objects are attained in accordance with this invention by a process for preparing acidic phosphorus-containing compositions comprising the reaction of a hydroxy-substituted triester of a phosphorothioic acid with an inorganic phosphorus reagent selected from the class consisting of phosphorus acids, phosphorus oxides, and phosphorus halides.

The hydroxy-substituted triesters of phosphorothioic acids useful in this invention include principally those having the structural formula

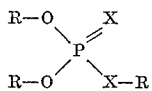

wherein R is selected from the class consisting of substantially hydrocarbon radicals and hydroxy-substituted substantially hydrocarbon radicals, at least one of the R radicals being a hydroxy-substituted substantially hydrocarbon radical, and X is selected from the class consisting of sulfur and oxygen, at least one of the X radicals being sulfur. The substantially hydrocarbon radicals include aromatic, aliphatic, and cycloaliphatic radicals such as aryl, alkyl, aralkyl, alkaryl, and cycloalkyl radicals. Such radicals may contain a polar substituent such as chloro, bromo, iodo, alkoxy, aryloxy, nitro, keto, or aldehydo group. In most instances there should be no more than one such polar group in a radical.

Specific examples of the substantially hydrocarbon radical are methyl, ethyl, isopropyl, secondary-butyl, isobutyl, n-pentyl, dodecyl, polyisobutene radical (molecular weight of 1500), cyclohexyl, cyclopentyl, 2-heptyl-cyclohexyl, phenyl, naphthyl, xenyl, p-heptylphenyl, 2,6-di-tertiary-butylphenyl, benzyl, phenylethyl, 3,5-dodecylphenyl, chlorophenyl, alpha - methoxy - beta-naphthyl, p-nitrophenyl, p-phenoxyphenyl, 2-bromoethyl, 3-chloro-cyclohexyl, and polypropylene (molecular weight of 300)-substituted phenyl radical.

The hydroxy-substituted substantially hydrocarbon radicals include principally the above-illustrated substantially hydrocarbon radicals containing a hydroxy group. Those having less than about 8 carbon atoms are preferred because of the convenience in preparing such hydroxy-substituted triesters. Examples of such radicals are hydroxymethyl, hydroxyethyl, 2-hydroxypropyl, 3-hydroxypropyl, 2-hydroxycyclohexyl, 2-hydroxycyclopentyl, 2-hydroxy-1-octyl, 1-hydroxy-3-octyl, 1-hydroxy-2-octyl, 2-hydroxy-3-phenyl-cyclohexyl, 1-hydroxy - 2-phenylethyl, 2-hydroxy-1-phenylethyl, 2-hydroxy-1-p-tolylethyl, and 2-hydroxy-3-butyl radicals. Other hydroxy-substituted substantially hydrocarbon radicals are exemplified by 2,5-dihydroxyphenyl, alpha-hydroxy-beta-naphthyl, 3-hydroxy-4-dodecyl, 3-hydroxy-6-octadecyl, and (p-hydroxyphenyl)-phenyl radicals.

A preferred class of the hydroxy-substituted triesters comprises those having the structural formula

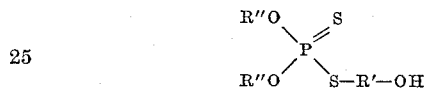

wherein R″ is a substantially hydrocarbon radical illustrated above and R′ is a bivalent substantially hydrocarbon radical such as alkylene or arylene radical derived from the previously illustrated substantially hydrocarbon radicals. A convenient method for preparing such esters involves the reaction of a phosphorodithioic acid with an epoxide or a glycol. Such reaction is known in the art. The following equations are illustrative of the reaction.

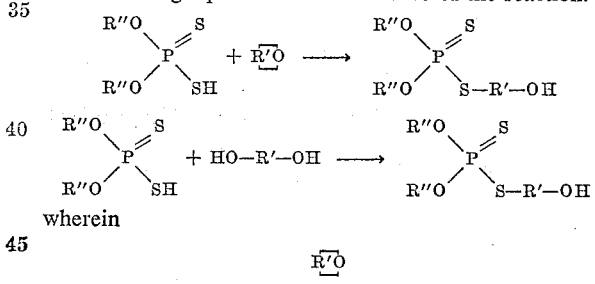

wherein

is an epoxide and HO—R′—OH is a glycol.

For reasons of economy aliphatic epoxides having less than about 8 carbon atoms and styrene oxides are preferred for use in the above process. Especially useful epoxides are exemplified by ethylene oxide, propylene oxide, styrene oxide, alpha-methylstyrene oxide, p-methylstyrene oxide, cyclohexene oxide, cyclopentene oxide, dodecene oxide, octadecene oxide, 2,3-butene oxide, 1,2-butene oxide, 1,2-octene oxide, 3,4-pentene oxide, and 4-phenyl-1,2-cyclohexene oxide. Glycols include both aliphatic and aromatic di-hydroxy compounds. The latter are exemplified by hydroquinone, catechol, resorcinol, and 1,2-dihydroxynaphthalene. Aliphatic glycols which are especially useful include ethylene glycol, trimethylene glycol, tetramethylene glycol, hexamethylene glycol, propylene glycol, pentylene glycol, decamethylene glycol, diethylene glycol, triethylene glycol, and pentaethylene glycol.

Another convenient method for preparing the hydroxy-substituted triesters comprises the addition of a phosphorodithioic acid to an unsaturated alcohol such as allyl alcohol, cinnamyl alcohol, or oleyl alcohol, as is described in U.S. 2,528,732. Still another method involves the reaction of a metal phosphorothioate with a halogen-substituted alcohol. This method is described in U.S. Re. 20,411.

The phosphorodithioic acids from which the hydroxy-substituted triesters can be derived are likewise well-known. They are prepared by the reaction of phosphorus pentasulfide with an alcohol or a phenol. The reaction involves 4 moles of the alcohol or phenol per mole of phosphorus pentasulfide and may be carried out within the temperature range from about 50° C. to about 200° C. Thus, the preparation of O,O'-di-n-hexylphosphorodithioic acid involves the reaction of phosphorus pentasulfide with four moles of n-hexyl alcohol at about 100° C. for about two hours. Hydrogen sulfide is liberated and the residue is the defined acid. The preparation of the phosphoromonothioic acid may be effected by treatment of the corresponding phosphorodithioic acid with steam. Phosphorotrithioic acids and phosphorotetrathioic acids can be obtained by the reaction of phosphorus pentasulfide with mercaptans or mixtures of mercaptans and alcohols.

The reaction of phosphorus pentasulfide with a mixture of phenols or alcohols (e.g., isobutanol and n-hexanol in 2:1 weight ratio) results in phosphorodithioic acids in which the two organic radicals are different. Such acids likewise are useful herein.

The preferred inorganic phosphorus reagent in the reaction with the hydroxy-substituted triesters of phosphorothioic acids is phosphorus pentoxide. Other phosphorus oxides such as phosphorus trioxide and phosphorus tetroxide likewise are useful. Also useful are phosphorus acids, and phosphorus halides. They are exemplified by phosphoric acid, pyrophosphoric acid, metaphosphoric acid, hypophosphoric acid, phosphorous acid, pyrophosphorous acid, metaphosphorous acid, hypophosphorous acid, phosphorus trichloride, phosphorus tribromide, phosphorus pentachloride, monobromophosphorus tetrachloride, phosphorus oxychloride, and phosphorus triiodide.

The reaction of the hydroxy-substituted triesters of phosphorothioic acids with the inorganic phosphorus reagent results in an acidic product. The chemical constitution of the acidic product depends to a large measure on the nature of the inorganic phosphorus reagent used. In most instances the product is a complex mixture the precise composition of which is not known. It is known, however, that the reaction involves the hydroxy radical of the triester with the inorganic phosphorus reagent. In this respect the reaction may be likened to that of an alcohol or a phenol with the inorganic phosphorus reagent. Thus, the reaction of the hydroxy-substituted triester with phosphorus pentoxide is believed to result principally in acidic phosphates, i.e., mono- or di-esters of phosphoric acid in which the ester radical is the residue obtained by the removal of the hydroxy radical of the phosphorothioic triester reactant. The product may also contain phosphonic acids and phosphinic acids in which one or two direct carbon-to-phosphorus linkages are present.

The acidic product of the reaction between the hydroxy-substituted triester with phosphorus oxyhalide or phosphoric acid is believed to result in similar mixtures of acidic phosphates, phosphonic acids, and/or phosphinic acids. On the other hand, the reaction of the hydroxy-substituted triester with phosphorus trichloride or phosphorous acid is believed to result principally in acidic organic phosphites. Still other products may be obtained from the use of the other inorganic phosphorus reagents illustrated previously. In any event, the product is acidic and as such is useful for the purposes of this invention.

Usually, from about one mole to about five moles of the triesters is used for each mole of the inorganic phosphorus reagent. The preferred proportion of the triester is about three to four moles for each mole of the phosphorus reagent. The use of amounts of either reactant outside these limits results in excessive, unused amounts of the reactant and is ordinarily not preferred.

The reaction of the hydroxy-substituted triester with the inorganic phosphorus reagent to produce the acidic intermediate can be effected simply by mixing the two reactants at a temperature above about room temperature, preferably above about 50° C. A higher temperature such as 100° C. or 150° C. may be used but ordinarily is unnecessary.

The following examples are illustrative of the process for preparing the acidic phosphorus-containing compositions of this invention. The acid number of the products of the examples is determined by ASTM procedure designation D–974.

Example 1

Phosphorus pentoxide (64 grams, 0.45 mole) is added at 58° C. throughout a period of 45 minutes to hydroxypropyl O,O'-di(4 - methyl - 2 - pentyl)phosphorodithioate (514 grams, 1.35 moles, prepared by treating di(4-methyl-2-pentyl)phosphorodithioic acid with 1.3 moles of propylene oxide at 25° C.). The mixture is heated at 75° C. for 2.5 hours, mixed with a filtering aid, and filtered at 70° C. The filtrate is found to have a phosphorus content of 11.8%, a sulfur content of 15.2%, and an acid number of 87 (bromphenol blue indicator).

Example 2

A mixture of 442 grams (0.925 mole) of hydroxypropyl O,O'-bis(dichlorophenyl)phosphorodithioate (prepared by the reaction of bis(dichlorophenyl)phosphorodithioic acid with 1.1 moles of propylene oxide at 30°–90° C.) and 43.6 grams (0.31 mole) of phosphorus pentoxide is heated at 140° C. for 0.5 hour, at 120°–125° C. for 3 hours, and then at 155°–160° C. for 1 hour. The product is found to have an acid number of 83 (bromphenol blue indicator).

Example 3

A mixture of 308 grams (2.68 moles) of phosphorus pentoxide and 2424 grams (6.5 moles) of hydroxyethyl O,O'-di(4-methyl-2-pentyl)phosphorodithioate is heated at 80°–90° C. for 7.5 hours and filtered. The filtrate has an acid number of 131 (phenolphthalein indicator).

Example 4

A mixture of 667 grams (4.7 moles) of phosphorus pentoxide and the hydroxypropyl O,O'-diisopropylphosphorodithioate prepared by the reaction of 3514 grams of diisopropylphosphorodithioic acid with 986 grams of propylene oxide at 50° C. is heated at 85° C. for 3 hours and filtered. The filtrate has a phosphorus content of 15.3%, a sulfur content of 19.6%, and an acid number of 126 (bromphenol blue indicator).

Example 5

A mixture of 35 grams (0.25 mole) of phosphorus pentoxide and 286 grams (1 mole) of hydroxypropyl O,O'-diisopropylphosphorodithioate is heated at 70°–80° C. for 3 hours. The product has a phosphorus content of 14.3%, a sulfur content of 20%, and an acid number of 154 (phenolphthalein indicator).

Example 6

Phosphorus pentoxide (42 grams, 0.3 mole) is added to 455 grams (0.9 mole) of 3-chloro-hydroxypropyl O,O'-diisooctylphosphorodithioate (prepared by reacting 1 mole of diisooctylphosphorodithioic acid with 1 mole of epichlorohydrin at 25°–65° C.) at 75° C. throughout a period of 45 minutes. The mixture is heated at 75° C. for 3 hours and filtered. The filtrate is found to have a phosphorus content of 9.35%, a sulfur content of 12.17%, and an acid number of 135 (phenolphthalein indicator).

Example 7

Phosphorus pentoxide (38 grams) is added to 398 grams of hydroxypropyl O,O'-di(4-methyl-2-pentyl)phosphoromonothioate (prepared by the reaction at 25°–65° C. of 52 grams of propylene oxide with 279 grams of O,O'-di(4-methyl-2-pentyl)phosphoromonothioic acid which in turn is prepared by treatment of O,O'-di(4-methyl-2-pentyl)phosphorodithioic acid with steam). The mixture is heated for 3 hours and filtered. The filtrate is found to have a phosphorus content of 12.6%, a sulfur content of 10.66%, and an acid number of 275 (phenolphthalein indicator).

*Example 8*

Phosphorus pentoxide (42 grams, 0.3 mole) is added at 75° C. throughout a period of 1.5 hours to 405 grams of phenylhydroxyethyl O,O'-di(4-methyl-2-pentyl)phosphorodithioate (prepared by the reaction of di(4-methyl-2-pentyl)phosphorodithioic acid with 1 mole of styrene oxide at 25°–65° C.). The mixture is heated at 75° C. for 3 hours and filtered. The filtrate is found to have a phosphorus content of 10.5%, a sulfur content of 13.9%, and an acid number of 181 (phenolphthalein indicator).

*Example 9*

Phosphorus pentoxide (33 grams) is added at 75° C. throughout a period of 45 minutes to 297 grams of hydroxyoctyl dicyclohexylphosphorodithioate (prepared by the reaction of dicyclohexylphosphorodithioic acid with 1 mole of 1,2-octene oxide at 25°–60° C.). The mixture is heated at 75° C. for 4 hours and filtered. The filtrate is found to have a phosphorus content of 9.87%, a sulfur content of 13.41%, and an acid number of 143 (phenolphthalein indicator).

*Example 10*

Phosphorus pentoxide (55.8 grams, 0.39 mole) is added at 60°–90° C. to 1358 grams (1.18 moles) of hydroxypropyl O,O'-bis(polyisobutene (molecular weight of 350)-substituted phenyl)phosphorodithioate and the resulting mixture heated at 110° C. for 6.5 hours and filtered. The filtrate has a phosphorus content of 4.3%, a sulfur content of 5%, and an acid number of 46 (bromphenol blue indicator).

*Example 11*

Phosphorus pentoxide (90 grams, 1.9 moles) is added at 25°–61° C. throughout a period of 1 hour to 1062 grams (1.7 moles) of hydroxypropyl O,O'-di(heptylphenyl)phosphorodithioate. The mixture is heated at 100° C. for 3.5 hours and filtered at 85° C. The filtrate is found to have a phosphorus content of 7.6%, a sulfur content of 10.8%, and an acid number of 70 (bromphenol blue indicator).

*Example 12*

Phosphorus thiochloride (85.5 grams, 0.5 mole) is added at 30° C. to 592 grams (1.5 moles) of hydroxypropyl O,O'-di(4-methyl-2-pentyl)phosphorodithioate. The mixture is heated at 85° C. for 6 hours and the residue is the product.

*Example 13*

Phosphoric acid (85% aqueous solution) (230 grams, 2 moles) is added at 30° C. to 1170 grams (3 moles) of hydroxypropyl O,O'-di(4-methyl-2-pentyl)phosphorodithioate. The mixture is heated to 70° C./20 mm. and then heated at 78° C. for 8 hours, during which period 83 grams of distillate is collected. The residue is filtered and the filtrate is found to have a phosphorus content of 12.3%, a sulfur content of 13.5%, and an acid number of 235 (phenolphthalein indicator).

*Example 14*

Phosphorus trichloride (46 grams, 0.33 mole) is added at room temperature throughout a period of 30 minutes to 388 grams (1 mole) of hydroxypropyl O,O'-di(4-methyl-2-pentyl)phosphorodithioate. The mixture is heated to 80° C./15 mm. in 3 hours and the residue is the product.

The acidic phosphorus-containing compositions prepared by the process illustrated above are useful for a variety of purposes. To illustrate, they are useful as insecticides or pesticides. An example of this utility is an insecticidal composition comprising an aqueous emulsion or a petroleum hydrocarbon solution containing from about 0.01% to about 5% by weight of an acidic phosphorus-containing composition. A more specific example is an emulsion comprising 97 parts (by weight) of water, 1 part of sodium dodecylbenzene sulfonate as the emulsifier, and 2 parts of a kerosene solution containing 40% of the product of Example 2. This emulsion is effective in controlling the infestation of aphids on vegetation.

Other uses of the acidic phosphorus-containing compositions include rust-inhibiting coating for ferrous metal surfaces, anti-wear additives in lubricants, and intermediates for the preparation of fire-resistant synthetic lubricants.

Another useful application of the acidic phosphorus-containing compositions is in the preparation of neutralized products by treatment with a basic reagent such as ammonia, amine, or a metal base. The neutralized products have been found to be effective as additives in lubricants to impart detergent properties as well as corrosion inhibiting, oxidation inhibiting, and extreme pressure properties. The metal bases useful for preparing the neutralized products include principally the basic compounds, i.e., carbonates, bicarbonates, hydroxides, oxides, hydrides, alcoholates, phenates, mercaptides, or sulfides of metals in Groups I and II of the Periodic Table. Such metals are exemplified by lithium, sodium, potassium, magnesium, calcium, strontium, barium, copper, cadmium, and zinc. Likewise useful are the elemental metals of these groups. Specific examples of the metal bases are barium oxide, calcium hydroxide, magnesium, strontium hydroxide hydrate, sodium hydride, magnesium phenate, potassium methoxide, zinc oxide, copper oxide, and cadmium.

A particularly useful class of neutralizing agents comprises ammonia and amines. The amines may be aliphatic amines, aromatic amines, cycloaliphatic amines, heterocyclic amines, or carbocyclic amines. Amines having from about 4 to about 30 aliphatic carbon atoms are preferred and aliphatic primary amines having more than about 12 carbon atoms and having the formula R–NH$_2$ wherein R is, for example, tert-dodecyl, tert-octadecyl, behenyl, stearyl docosyl, hexatriacontanyl, or pentahexacontanyl radical are especially useful. Examples of other useful amines include cyclohexylamine, n-hexylamine, n-dodecylamine, di-dodecylamine, tri-dodecylamine, N-methyl-octylamine, butylamine, oleyl amine, myristyl amine, and N-dodecyl-trimethylene diamine, aniline, o-toluidine, benzidine, phenylene diamine, N,N'-dibutyl-phenylene diamine, beta-naphthylamine, morpholine, piperazine, menthane diamine, cyclopentylamine, ethylene diamine, hexamethylene tetramine, tetraethylene pentamine, octamethylene diamine, and N,N'-dicyclohexyl-phenylene diamine.

The neutralization of the acidic phosphorus-containing composition with a basic reagent is in most instances exothermic and can be carried out simply by mixing the reactants at ordinary temperatures, preferably from about 0° C. to about 200° C. The chemical constitution of the neutralized product depends to a large extent upon the type of the basic reagent used and the reaction conditions (e.g., temperature). Thus, at relatively low temperatures such as below 80° C. the product from the reaction of the acidic phosphorus-containing composition with an amine or ammonia comprises predominantly a salt, whereas at temperatures above about 100° C. such product may contain amides, amidines, or mixtures thereof. However, the reaction of the acidic phosphorus-containing composition with a tertiary amine results only in a salt.

The relative proportions of the acidic phosphorus-containing composition and the basic neutralization reagent used are preferably such that a substantial proportion of the acidity of the reactant is neutralized. The lower limit as to the amount of the basic reagent used is based primarily upon the consideration of the utility of the product formed. In some instances enough basic reagent should be used as to neutralize at least about 50% of the acidity of the phosphorus-containing composition. When used as additives in hydrocarbon oils, however, substantially neutral products such as are obtained by neutralizing at least about 90% of the acidity of the phosphorus-containing composition are desirable, whereas for use as insecticides or rust-preventive agents for treatments of metals, products obtained by neutralizing as little as about 50% of acidity of the phosphorus-containing composition are effective.

A specific example illustrating the preparation of a substantially neutral product useful as an additive in lubricants is as follows: The acidic phosphorus-containing composition (1980 grams) prepared by the process of Example 3 above is neutralized by treatment with a stoichiometrically equivalent amount (887 grams) of a commercial aliphatic primary amine having an average molecular weight of 191 in which the aliphatic radical is a mixture of tertiary-alkyl radicals containing from 11 to 14 carbon atoms. The neutralization is carried out at room temperature and the neutralized product is found to have a phosphorus content of 9.9% and a nitrogen content of 1.3%. The neutralized product has high thermal stability. Addition of this neutralized product (3% by weight) to an automobile rear axle lubricant comprising a SAE 90 mineral lubricating oil improves the load-carrying properties of the lubricant.

What is claimed is:

1. An acidic phosphorus-containing composition prepared by the process comprising the reaction of a hydroxy-substituted triester of a phosphorothioic acid having the formula

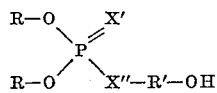

wherein R is an organic radical selected from the class consisting of alkyl, cycloalkyl, aryl, and polar-substituted derivatives of each of the above, and R' is an organic radical selected from the class consisting of alkylene, cycloalkylene, arylene, phenylalkylene, and phenylcycloalkylene, and X' and X'' are selected from the class consisting of oxygen and sulfur, at least one being sulfur, with an inorganic phosphorus reagent selected from the class consisting of phosphorus acids, phosphorus oxides and phosphorus halides.

2. The acidic phosphorus-containing composition of claim 1 characterized further in that the inorganic phosphorus reagent is phosphorus pentoxide.

3. An acidic phosphorus-containing composition prepared by the process comprising the reaction of a hydroxy-substituted triester of a phosphorodithioic acid having the formula

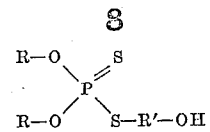

wherein R is an organic radical selected from the class consisting of alkyl, cycloalkyl, aryl, and polar-substituted derivatives of each of the above, and R' is an organic radical selected from the class consisting of alkylene, cycloalkylene, arylene, phenylalkylene, and phenylcycloalkylene, with phosphorus pentoxide.

4. The acidic phosphorus-containing composition of claim 3 characterized further in that R of the formula is alkaryl and R' of the formula is alkylene.

5. The acidic phosphorus-containing composition of claim 3 characterized further in that R of the formula is alkyl and R' of the formula is alkylene.

6. An acidic phosphorus-containing composition prepared by the process comprising the reaction of a hydroxy substituted triester of a phosphorodithioic acid having the formula

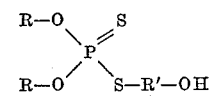

wherein R is an organic radical selected from the class consisting of alkyl and polar-substituted alkyl, and having from about 3 to about 30 carbon atoms and R' is lower alkylene, with phosphorus pentoxide at a temperature within the range from about 50° C. to about 150° C., the molar ratio of the hydroxy-substituted triester to phosphorus pentoxide being within the range of from about 1:1 to about 5:1.

7. The acidic phosphorus-containing composition of claim 6 characterized further in that R of the formula is alkyl and R' of the formula has less than 8 carbon atoms.

8. An acidic phosphorus-containing composition prepared by the process comprising the reaction of hydroxypropyl O,O' - di(heptylphenyl)phosphorodithioate with phosphorus pentoxide at a temperature within the range from about 50° C. to about 150° C., the molar ratio of said phosphorodithioate to the phosphorus pentoxide being about 3:1.

References Cited by the Examiner

UNITED STATES PATENTS 2,193,963  3/40  Hochwalt _____ 260—461

FOREIGN PATENTS 948,156  8/56  Germany.

OTHER REFERENCES

Kosolapoff: "Organo Phosphorus Compounds," 1950, John Wiley & Sons Inc., New York, N.Y., pp. 222–236 and 345–346 and 189.

CHARLES B. PARKER, *Primary Examiner.*

MORRIS LIEBMAN, IRVING MARCUS, *Examiners.*